United States Patent [19]
Hashimoto

[11] Patent Number: 5,896,134
[45] Date of Patent: Apr. 20, 1999

[54] Z BUFFER HIDDEN SURFACE REMOVAL DEVICE

[75] Inventor: Takeshi Hashimoto, Chiba, Japan

[73] Assignee: Sharp Kabushiki Kaisha, Osaka, Japan

[21] Appl. No.: 08/976,075

[22] Filed: Nov. 21, 1997

Related U.S. Application Data

[63] Continuation of application No. 08/458,752, Jun. 2, 1995, abandoned.

[30] Foreign Application Priority Data

Mar. 9, 1995 [JP] Japan .................... 7-049799

[51] Int. Cl.$^6$ .................................................. G06T 15/40
[52] U.S. Cl. .......................................................... 345/422
[58] Field of Search ................................. 345/419–430

[56] References Cited

U.S. PATENT DOCUMENTS

| | | | |
|---|---|---|---|
| 5,265,199 | 11/1993 | Catlin ........................... | 345/422 |
| 5,339,386 | 8/1994 | Soddenberg et al. ........... | 345/422 |
| 5,490,238 | 2/1996 | Watkins ........................... | 345/422 |
| 5,526,471 | 6/1996 | Tannenbaum et al. ........... | 345/419 |
| 5,528,738 | 6/1996 | Sfarti et al. ..................... | 345/443 |
| 5,583,974 | 12/1996 | Winner et al. ................... | 345/422 |
| 5,613,050 | 3/1997 | Hochmuth et al. ............... | 345/422 |

FOREIGN PATENT DOCUMENTS

| | | |
|---|---|---|
| A379983 | 8/1990 | European Pat. Off. . |
| A527587 | 2/1993 | European Pat. Off. . |
| A553973 | 8/1993 | European Pat. Off. . |
| 9002990 | 3/1990 | WIPO . |
| WOA9118359 | 11/1991 | WIPO . |

OTHER PUBLICATIONS

Foley et al., Computer Graphics: Principles and Practice, Addison–Wesley Publishing Co., 754–755, 1990.

*Primary Examiner*—Anton Fetting

[57] ABSTRACT

A Z buffer hidden surface removal device calculates the lightness of the sun appearing from behind the cloud and decides whether two planes cross each other or not. The device includes an input-output portion for inputting Z data, an address, and counter data, from the outside and outputting a counter value, Z data, and a write control signal, to the outside. The device further includes a Z buffer portion for reading and writing Z data according to a Z buffer address and a Z buffer portion control signal, a Z operation circuit portion for inputting a Z value and outputting the write control signal and a result of a Z operation, and a counter portion for counting a number of Z data in which the result of the Z operation circuit portion matches with a predetermined condition, among the data that were input to the Z operation circuit portion. There is also disclosed a device in which an A modulator portion for outputting an opacity value from the Z operation result is provided instead of the counter portion. The operations are performed on a pixel basis.

3 Claims, 12 Drawing Sheets

Z BUFFER HIDDEN SURFACE REMOVAL DEVICE

This application is a continuation, of application Ser. No. 08/458,752 filed on Jun. 2, 1995, now abandoned.

BACKGROUND OF THE INVENTION

1. Field of the Invention

The present invention relates to a Z buffer hidden surface removal device (HSRD), and more particularly to a hidden surface removal device that uses the depth information (Z data) of an object drawn in a three-dimensional or two-dimensional image display device to perform hidden surface removal by a Z buffer.

2. Description of the Related Art

A conventional graphic engine usually has a frame buffer and a Z buffer. The frame buffer serves as a memory for holding the digital expressions of the color and brightness of each pixel within an image, such as a dynamic random access memory (DRAM) or a static random access memory (SRAM). The Z buffer serves as a memory for holding a numeral for each pixel within the frame buffer. The numeral stored in this Z buffer is called Z data or a Z value and is depth information representative of the distance between an observer and an object displayed with pixels. Smaller Z data indicates that the object is closer to the observer.

As shown in FIG. 5, a conventional Z buffer HSRD comprises an input-output portion 1 for performing input-output of data such as a Z value, a counter value, and an address, with the outside, a Z buffer portion 2 for storing a Z value, and a Z operation circuit portion 6 for inputting the Z value and outputting a write control signal and an operation result.

Next, the operation of this conventional Z buffer HSRD will be described along the flowchart of FIG. 6.

By the Z operation circuit portion 6, two data of Z data (Zs) and a write address (Adr) are read out from the input-output portion 1 (step S101). By the Z operation circuit portion 6, Z data (Zd) being currently stored in an address (Adr) within the Z buffer portion 2 is taken out of the Z buffer portion 2 (step S102). The Z data (Zs) from the input-output portion 1 and the Z data (Zd) taken out of the Z buffer portion 2 are compared (step S103). When the Z data (Zs) is smaller (step S104), i.e., when a desired pixel is on the side closer to the observer, a "1" is output as a write control signal (step S105). This write control signal is also used in the writing to the Z buffer portion 2, and in the case of "1,"the Z data (Zs) from the input-output portion 1 is written to the position of the address (Adr) of the Z buffer portion 2 (step S106). Also, when it is determined in the step S104 that Zd is smaller than Zs, a "0" is output as a write control signal (step S107), and in this case, nothing is written to the Z buffer portion 2.

The above-described operation is performed for each of Z data that are desired to be written.

FIGS. 7A to 7C show ideal hidden surface removal processes. In the figures, the right direction represents a Z-axis direction and the arrow represents a direction in which an observer is seeing. FIG. 7A shows data written first, and FIG. 7B shows data that is newly written with respect to the first data. FIG. 7C shows a result in which ideal hidden surface removal was accomplished by overlapping two pixel data. Thus, only pixels close to the view point of the observer remain.

FIGS. 8A to 8C show the results obtained as data was written in the same method as a write method of normal memories. In normal writing, data is always overwritten. If data is written over the first data of FIG. 8A, the result will become as shown in FIG. 8B. As a result, since data written later always remains as shown in FIG. 8C, consequently, hidden surface removal will not be performed correctly.

FIGS. 9A to 9C show the processes of removing a hidden surface by a conventional Z buffer method. If data to be written is laid over the data of FIG. 9A, the result will become as shown in FIG. 9B. If greater Z data is not written like the crosshatched pixels of FIG. 9B or if it is overwritten by other Z data, then it does not remain in the Z buffer. Among Z data finally written in all addresses of the Z buffer, the smallest data remains as shown in FIG. 9C.

The hidden surface removal is performed in this way, and what is output from the conventional Z buffer HSRD is a write control signal representative of the possibility and impossibility of writing for each data, and Z data that finally remained within the Z buffer.

However, the Z data of the above-described HSRD is insufficient in applications such as virtual reality in which an image of high picture quality needs to be generated with real time.

FIG. 10A illustrates the sun appearing from behind the cloud and the glow generated around it. When you see a very light object with your naked eyes, the light passing through the eyelashes is diffracted and radial rays generate around the object.

The drawing method of the sun and the cloud will hereinafter be described.

First an image of the cloud is drawn with a certain Z value, as shown in FIG. 10B, and then an image of the sun is drawn with a greater Z value than that, as shown in FIG. 10C. Finally an image of the glow is drawn with a Z value smaller than the cloud. When ideal hidden surface removal is performed, there is no possibility that a pixel being in a longer distance is written over a pixel being in a shorter distance, so there is no possibility that the image of the sun is written over the image of the cloud. Therefore, a result like FIG. 10C is obtained. Incidentally, it is preferable that for reality, the glow of the sun change according to the lightness of the sun. The lightness of the sun can be approximated with constant times the visual field area of the sun not hidden by other object, i.e., the uncovered visual field area of the sun. The uncovered visual field area can be obtained in the process of the hidden surface removal. First, all objects that can become an obstacle are drawn, and finally the image of the sun is drawn. If the number of pixels that were hidden-surface removed is subtracted from the number of pixels of the image of the sun, the number of uncovered pixels of the sun will be obtained.

The hidden surface removal is performed as described above, but what is output from the conventional Z buffer HSRD was binary data indicating that the pixel having the Z value can be drawn to the frame buffer or the pixel having the Z value cannot be drawn to the frame buffer.

However, when the above-described HSRD is used in applications such as virtual reality in which there is the need of generating an image of high picture quality with real time, the device having only binary information is often insufficient.

FIGS. 11A, 11B and FIGS. 12A and 12B are examples of the case where binary hidden surface removal is insufficient.

FIGS. 11A and 11B which are a first example is a case where an object whose outline is dim and which projects from a wall is drawn. In this case, as shown in FIG. 11A, it is preferable that the object be drawn so that it becomes transparent as it comes closer to the wall. However, when hidden surface removal is performed with only binary information, a boundary line between the object and the wall, indicated by the arrow of FIG. 11B, becomes clear and the dim feeling of the object disappears.

FIGS. 12A and 12B which are a second example is a case where an object projecting from muddy water is drawn. In this case, as shown in FIG. 12A, it is preferable that the water around the object projecting from muddy water be transparent. However, when hidden surface removal is performed with only binary information, a boundary line between the object and the wall becomes clear and the transparent feeling of water disappears, as shown in FIG. 12B.

As described above, when the image of the sun is sufficiently large, it can be used as an uncovered visual field area of the sun, but since the conventional Z buffer HSRD outputs only a write control signal representative of the possibility or impossibility of writing for each data, and Z data that finally remained in the Z buffer, the above-described number of uncovered visual field pixels and number of pixels to be drawn could not be provided to an observer. Therefore, the number of uncovered visual field pixels and the number of pixels to be drawn, which are used when the lightness of the sun appearing from behind the cloud is calculated, cannot be output.

Also, since the conventional HSRD outputs a result of a Z operation only as binary data indicating that a pixel with the Z value can be drawn to the frame buffer or a pixel with the Z value cannot be drawn to the frame buffer, sufficient information cannot be provided when an object whose lightness changes according to the distance and thickness is drawn.

SUMMARY OF THE INVENTION

An object of the present invention is to provide a Z buffer hidden surface removal device (HSRD) which is capable of overcoming the above-described problems, calculating the lightness of the sun appearing from behind the cloud without increasing the capacity of a memory, and displaying an image with far and near feelings by deciding whether two planes cross each other or not.

This and other objects are achieved by a hidden surface removal device comprising: a Z buffer for storing a Z value of each of pixels to be displayed; an input-output for inputting and outputting data such as a Z value, a counter value, and an address; a Z operation circuit which uses said Z value input for each pixel by the input-output the Z value stored in said buffer to perform a Z operation and which, according to a result of the Z operation, outputs a write control signal to the input-output and also outputs the Z operation result to the input-output; and a Z counter for counting a number of pixels matching with a predetermined condition, based on the Z operation result.

In the above-described Z buffer HSRD, a Z operation between a Z value input for each pixel and a Z value stored in the Z buffer is performed by the Z operation circuit, and a number of pixels matching a result of the Z operation is counted by the Z counter. With this, it becomes possible to read out the number of covered visual field pixels and the number of pixels to be drawn, and it becomes easy to calculate from the number of covered visual field pixels the lightness of the sun appearing from behind the cloud and to decide whether two planes cross each other or not, so it becomes possible to provide image information with far and near feelings and reality.

In accordance with another aspect of the present invention, there is provided a hidden surface removal device comprising: Z buffer means for storing a Z value of each of pixels to be displayed; an input-output for inputting and outputting data such as a Z value, an Opacity value, and an address; a Z operation circuit which uses the Z value input for each pixel by the input-output the Z value stored in the buffer to perform a Z operation and which, according to a result of the Z operation, outputs a write control signal to the input-output and also outputs the Z operation result to said input-output; and means for changing said Opacity value based on said Z operation result.

In the above-described Z buffer HSRD, a Z operation between a Z value input for each pixel and a Z value stored in the Z buffer is performed by the Z operation circuit means, and an Opacity value is changed according to a result of the Z operation by the Opacity value changing means. With this, there is obtained information necessary when drawing an object whose transparency changes according to the distance and thickness, so it becomes possible to provide image information with far and near feelings and reality.

Further objects and advantages of the present invention will be apparent from the following description of the preferred embodiments of the invention as illustrated in the accompanying drawings.

DESCRIPTION OF THE PREFERRED EMBODIMENTS

A preferred embodiment of a Z buffer hidden surface removal device (HSRD) in accordance with the present invention will hereinafter be described with reference to the accompanying drawings.

Figure 1:
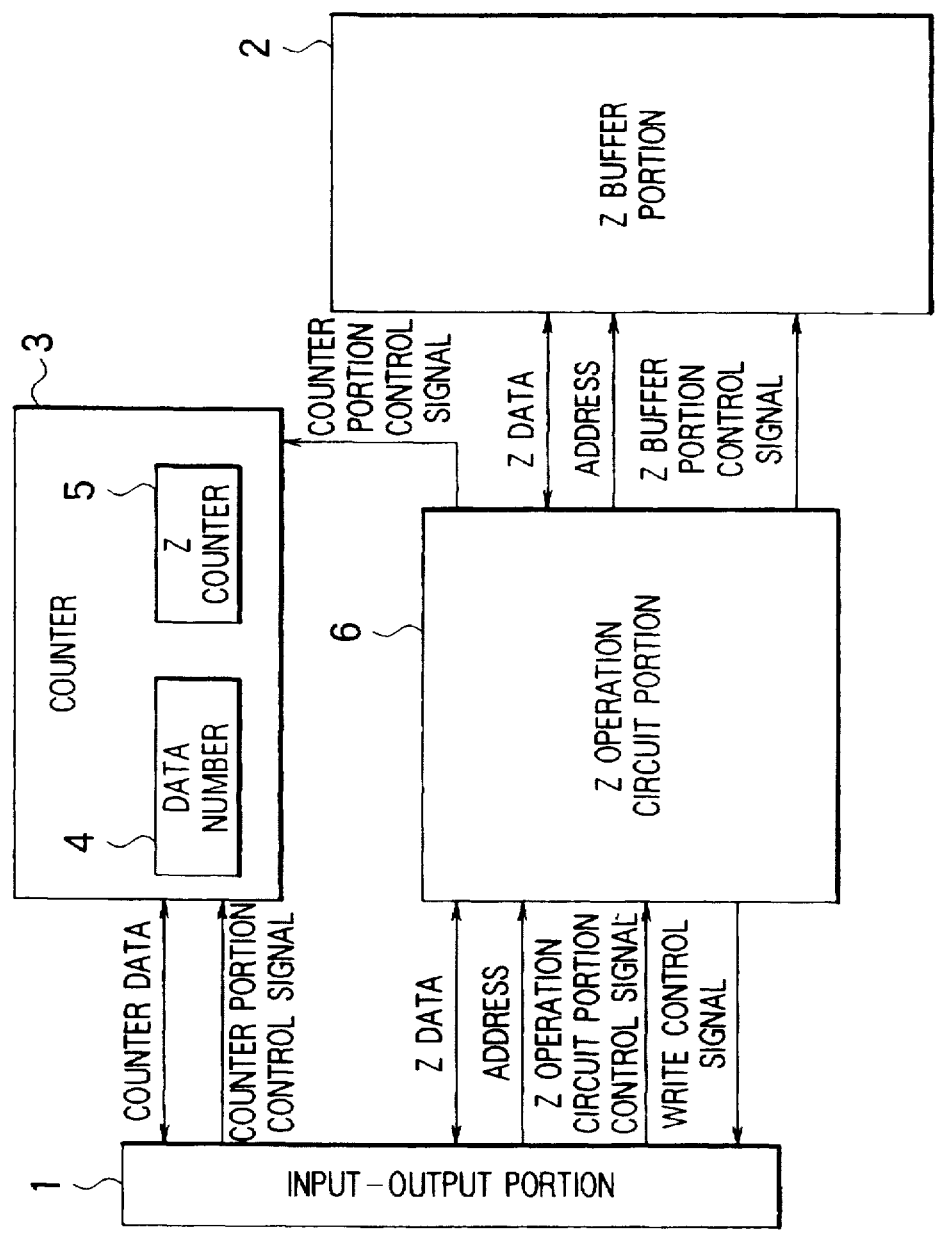
FIG. 1 is a block diagram showing a first embodiment of a Z buffer HSRD of the present invention.

The Z buffer HSRD of this embodiment, as shown in FIG. 1, comprises an input-output portion 1 for inputting Z data, an address, and counter data, from the outside and for outputting counter data, Z data, and a write control signal, to the outside. The Z buffer HSRD further includes a Z buffer portion 2 in which reading and writing of Z data are performed according to a given Z buffer address and a given Z buffer portion control signal, a Z operation circuit portion 6 for inputting a Z value and outputting a write control signal and an operation result, and a counter portion 3 for counting a number of Z data in which, among data that were input to the Z operation circuit portion 6, a result of the Z operation circuit portion 6 matches with predetermined conditions. The counter portion 3 consists of a data number counter 4 and a Z counter 5, and can input or output the values of the respective counters from or to the input-output portion 1. The data number counter 4 and Z counter 5 of the counter portion 3 are controlled by a counter control signal from the Z operation circuit portion 6.

Figure 2:
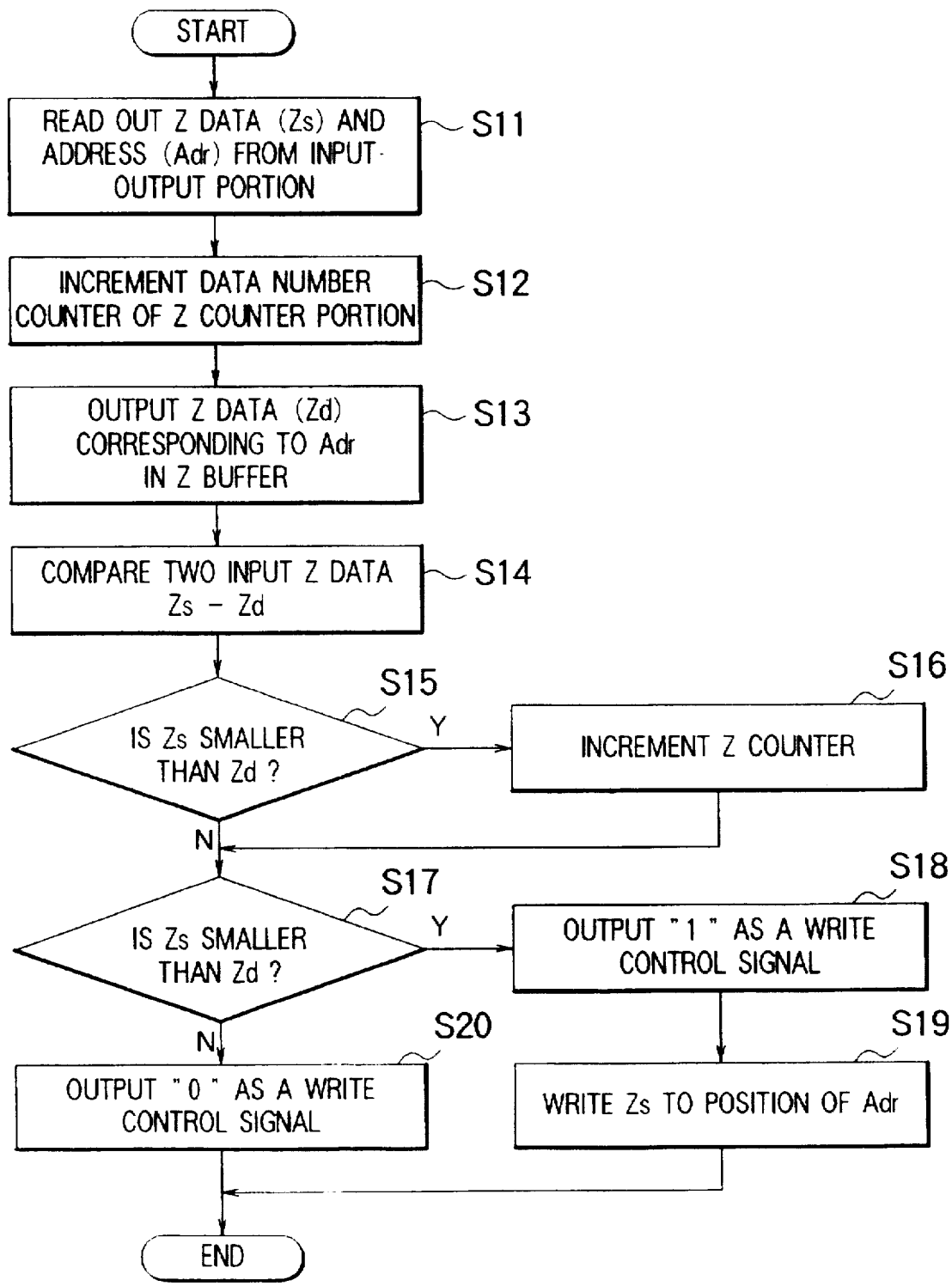
FIG. 2 is a flowchart showing the operation of the device of FIG. 1.

The operation of this embodiment will hereinafter be described along the flowchart of FIG. 2. Assume that the Z operation circuit portion 6 is in a new data waiting state.

If data is input from the outside to the input-output portion 1, it will inform the Z operation circuit portion 6 that an address (Adr) and Z data (Zs) arrived, with the Z operation circuit portion control signal. The Z operation circuit portion 6 reads out the address (Adr) and the Z data (Zs) (step S11) and at the same time outputs an increment request to the data number counter 4 with the counter control signal. The counter portion 3 then receives this request and the data number counter 4 is incremented (step S12). The Z operation circuit portion 6 supplies the address (Adr) to the Z buffer portion 2, and outputs an output request to the Z buffer portion 2 through the Z buffer portion control signal. In response to the Z buffer portion control signal, the Z buffer portion 2 outputs Z data (Zd) stored in the position of the address (Adr) (step S13). The Z data (Zs) input from the Z buffer portion 2 and the Z data (Zd) input from the input-output portion 1 are compared by the Z operation circuit portion 6 (step S14).

With the Z operation circuit portion control signal input from the input-output portion 1, it is determined, as a first condition for comparing Z data, if Zs is smaller than Zd (step S15). When Zs is smaller than Zd, a request to increment the Z counter 5 is output with the counter control signal and the Z counter 5 is incremented (step S16). Then, when the comparison result matches with a second condition determined by the Z operation circuit portion control signal that was input from the input-output portion 1 (step S17), the write control signal goes to a "1" (step S18). The Z data Zs and the address Adr are output to the Z buffer portion 2, a write request is made with the Z buffer portion control signal, and according to that request, the Z buffer portion 2 stores the Z data in the position corresponding to that address (step S19). When, on the other hand, Zs is not smaller than Zd, the write operation is not performed in the Z buffer portion 2. In this case, the write control signal goes to a "0" (step S20). The Z operation circuit portion 6 outputs the write control signal to the outside through the input-output portion 1 and then becomes in a new data waiting state. The operation described above will be repeated.

The exceptional operation of this embodiment will hereinafter be described.

If a request to reset the counter portion 3 is made from the outside, the input-output portion 1 will output the counter portion control signal to the counter portion 3 to request resetting. Either or both of the data number counter 4 and the Z counter 5 is reset according to the reset request by the counter portion 3. Thereafter, if a request to output Z data is made from the outside, the input-output portion 1 will output the address to the Z operation circuit portion 6 and also output a transfer request of the Z data to the circuit portion 6 with the Z operation circuit portion control signal. According to the request, the Z operation circuit portion 6 outputs the address to the Z buffer portion 2 and also requests the output of the Z data with the Z buffer control signal. According to the output request, the Z buffer portion 2 outputs Z data corresponding to the address. Then, the Z operation circuit portion 6 receives the Z data and outputs it to the input-output portion 1. The Z data received by the input-output portion 1 is output to the outside. If an output request of a counter value is made from the outside, the input-output portion 1 will send the counter portion control signal to the counter portion 3 to request the counter portion 3 to output a counter value. According to the output request, the counter portion 3 outputs the value of the Z counter 5 or data number counter 4 to the input-output portion 1. The counter value received by the input-output portion 1 is output to the outside.

Another preferred embodiment of the Z buffer HSRD in accordance with the present invention will hereinafter be described with reference to FIGS. 3 and 4.

Figure 3:
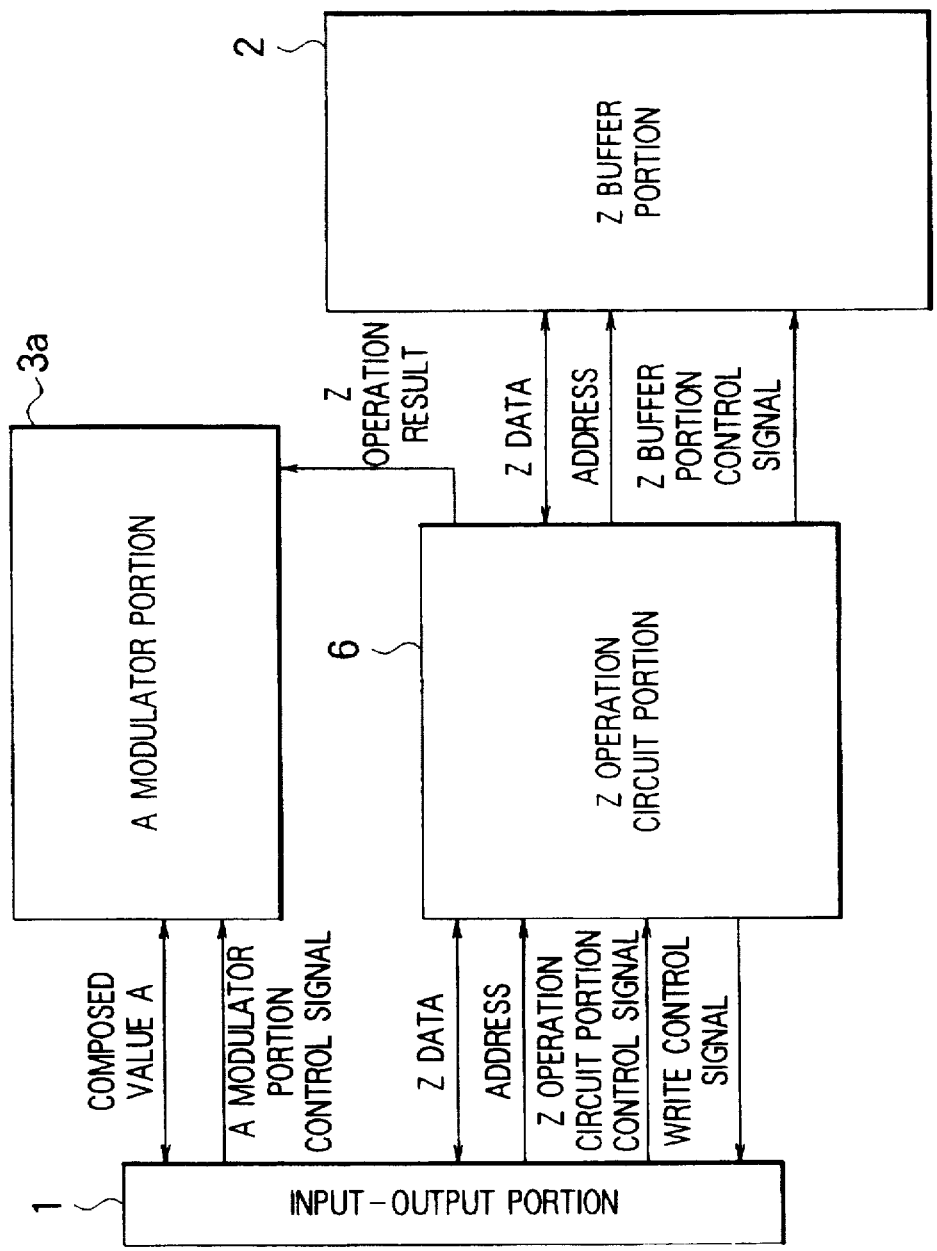
FIG. 3 is a block diagram showing a second embodiment of the Z buffer HSRD of the present invention.
Figure 4:
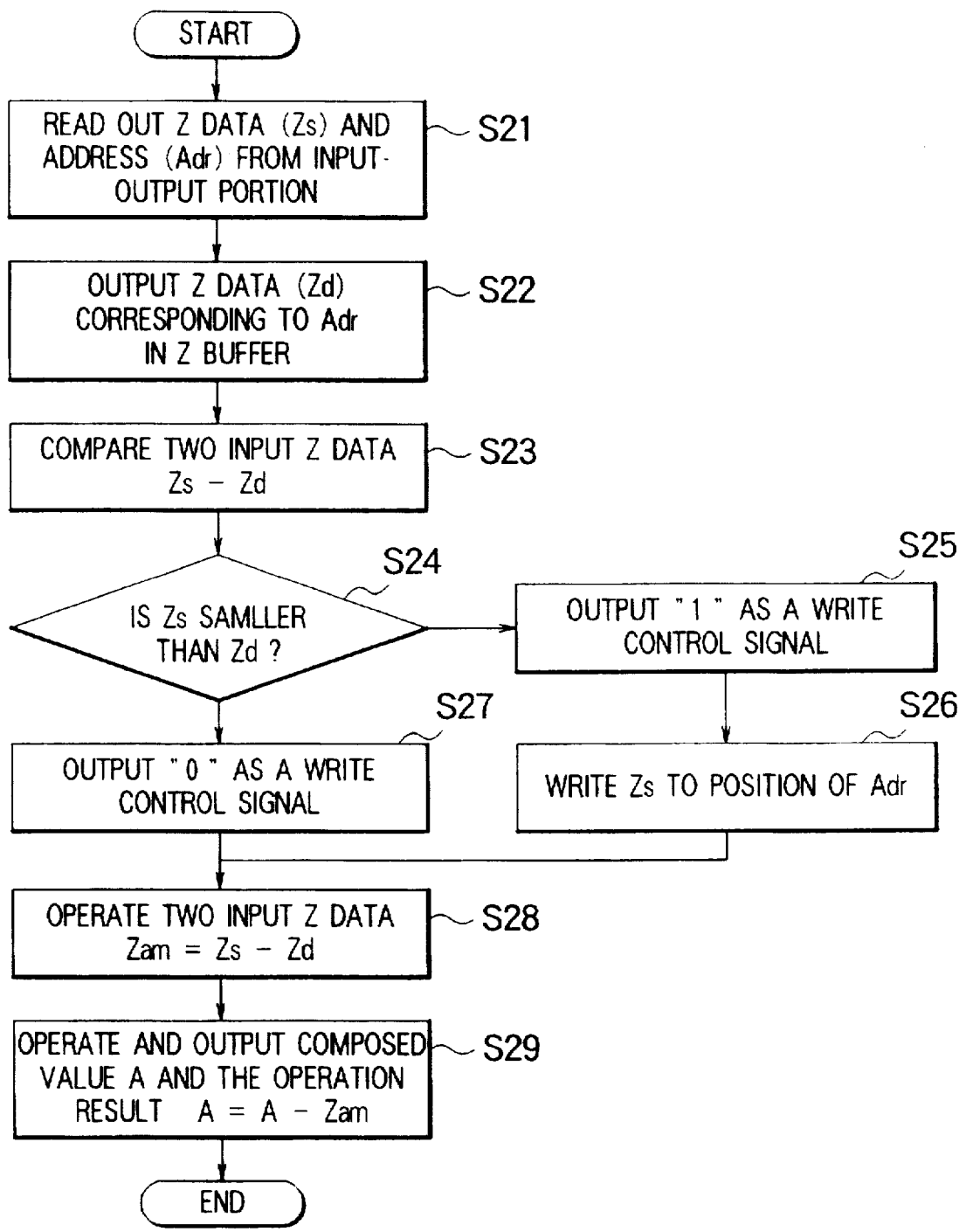
FIG. 4 is a flowchart showing the operation of the device of FIG. 3.
Figure 5:
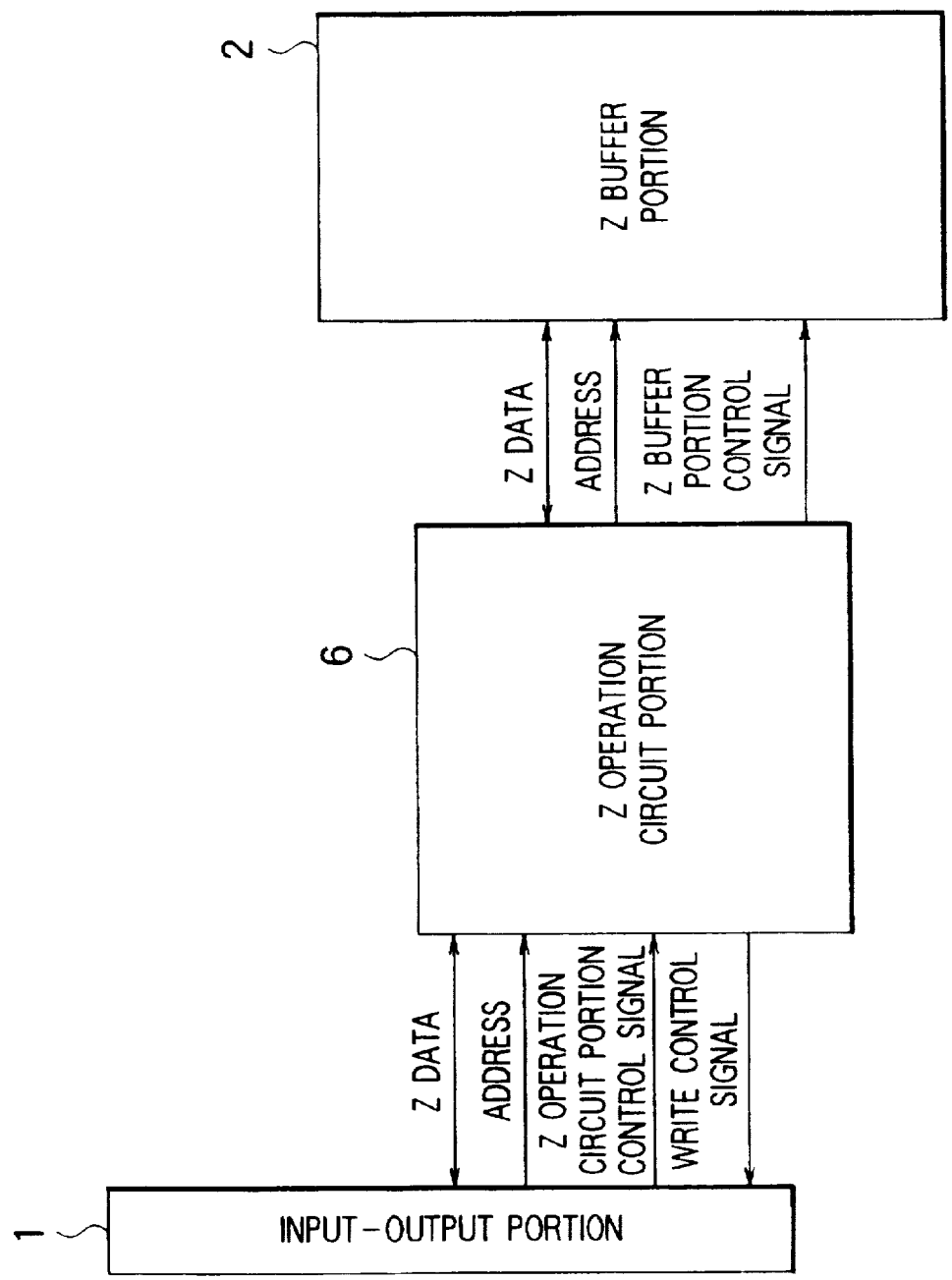
FIG. 5 is a block diagram showing the configuration of the conventional HSRD.
Figure 6:
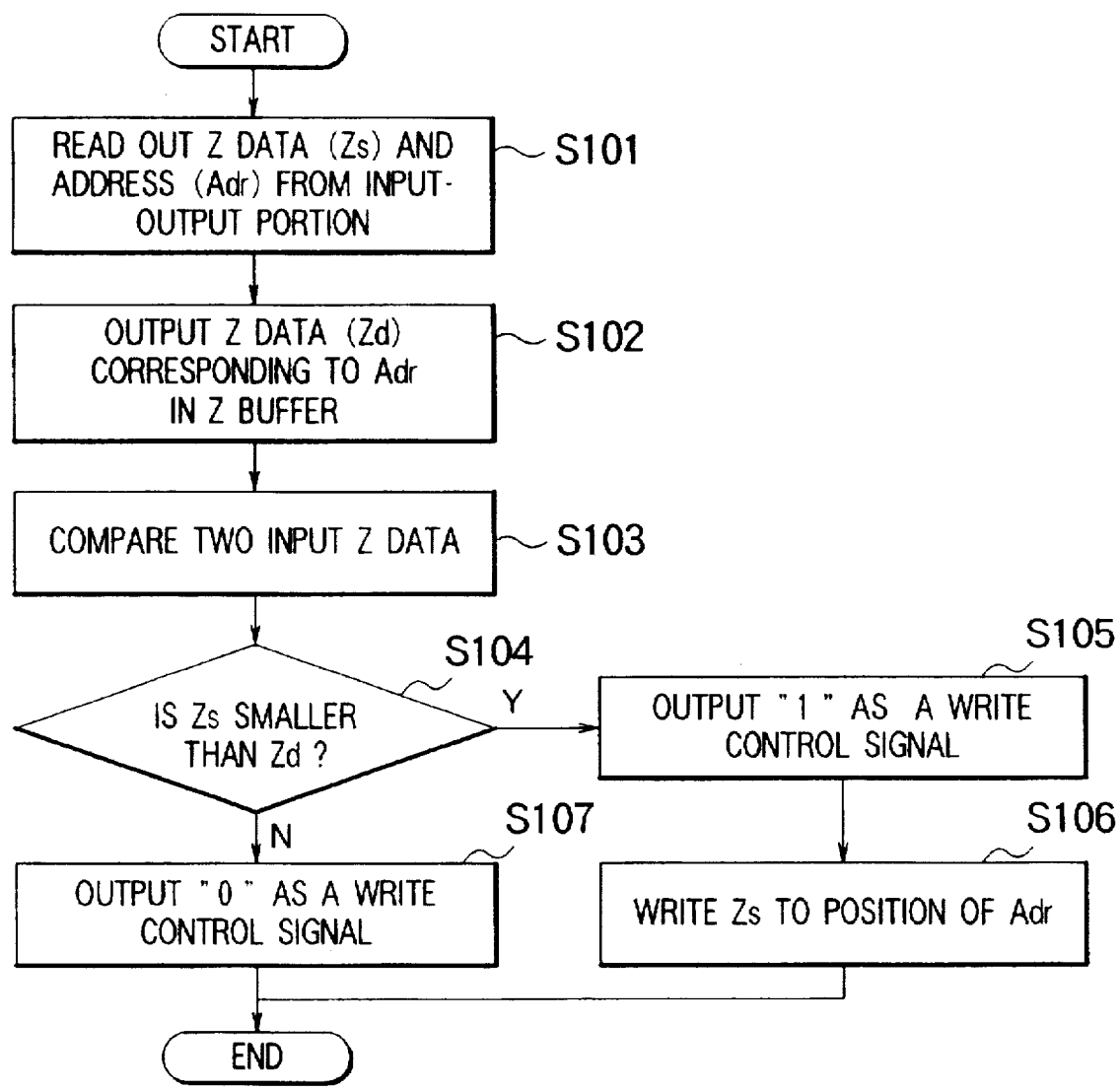
FIG. 6 is a flowchart showing the operation of the conventional device of FIG. 5.
Figure 7A:
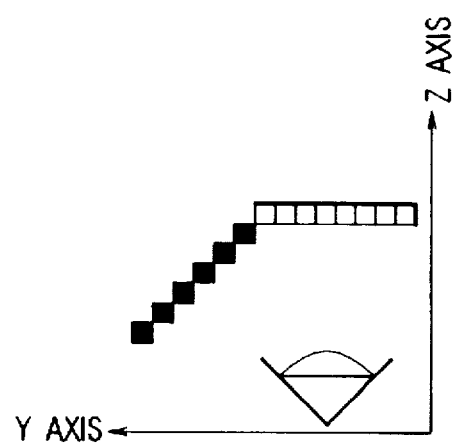
FIGS. 7A to 7C illustrate ideal hidden surface removal processes.
Figure 7B:
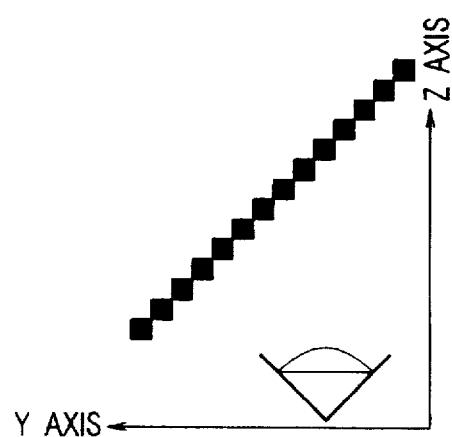
Figure 7C:
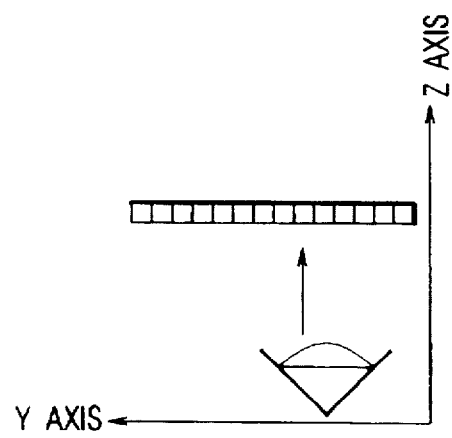
Figure 8A:
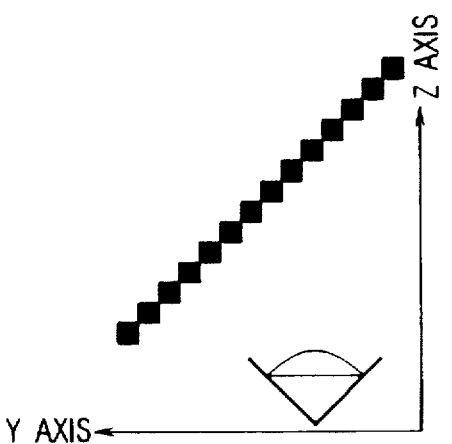
FIGS. 8A to 8C are diagrams showing processes in which hidden surface removal is not performed correctly.
Figure 8B:
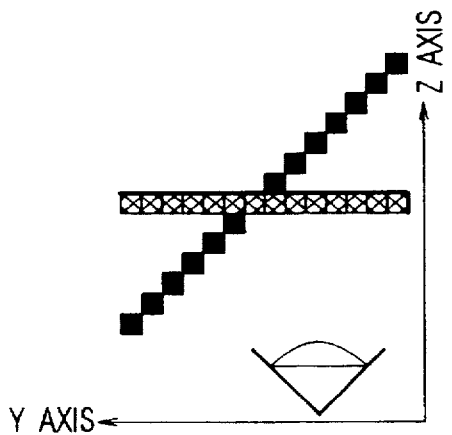
Figure 8C:
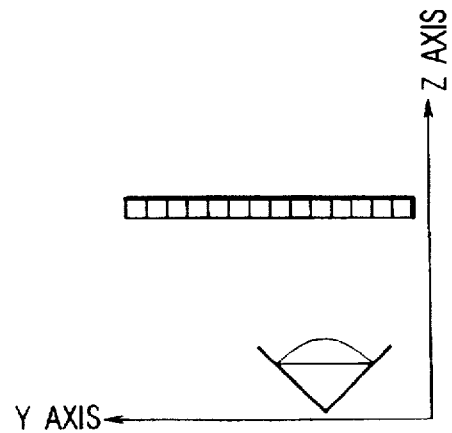
Figure 9C:
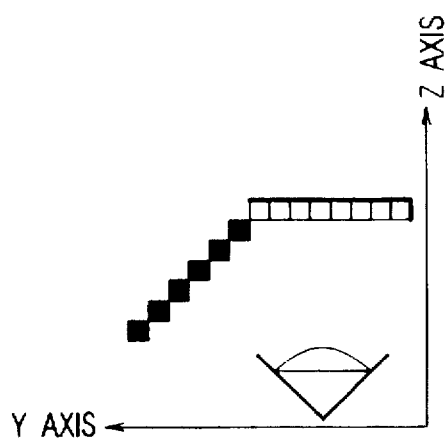
FIGS. 9A to 9C are diagrams showing the processes of removing a hidden surface by a conventional Z buffer method.
Figure 9B:
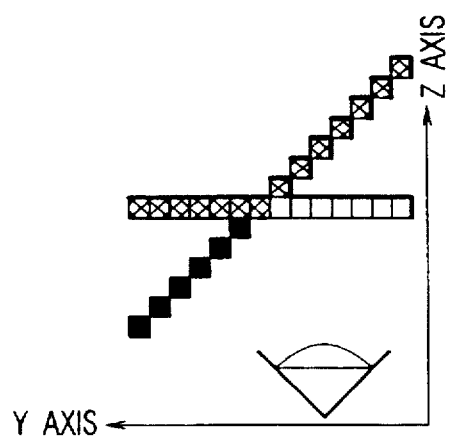
Figure 9A:
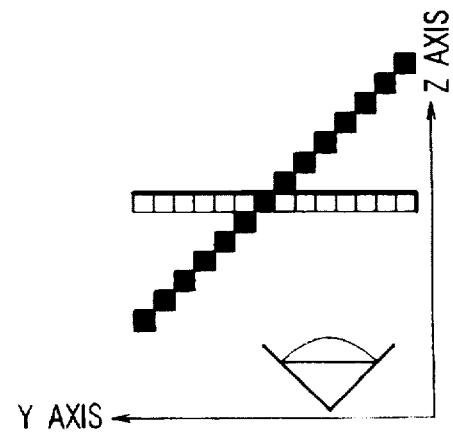
Figure 10A:
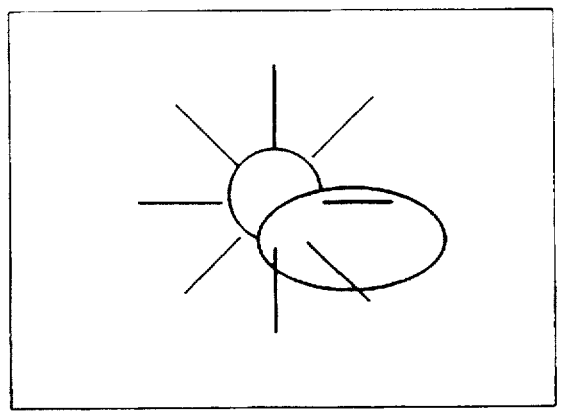
FIGS. 10A to 10C are diagrams used to explain how a hidden surface is removed.
Figure 10B:
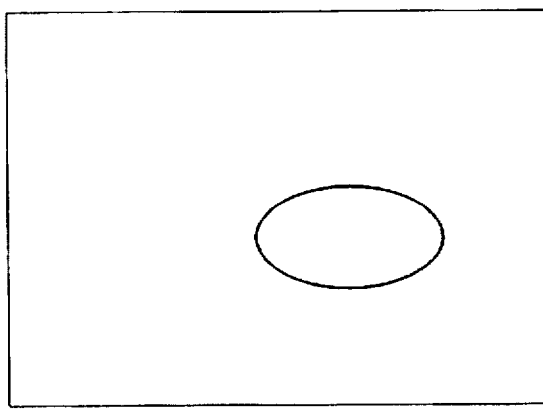
Figure 10C:
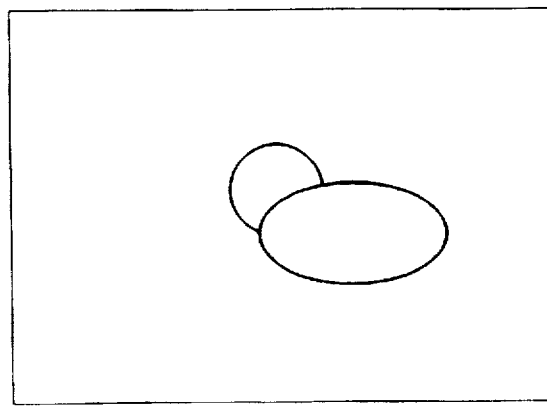
Figure 11A:
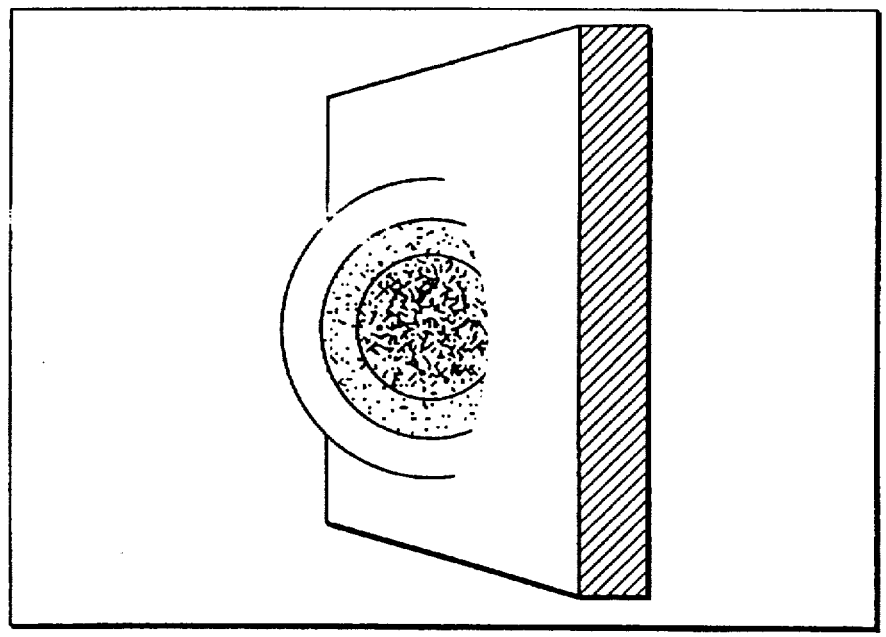
FIGS. 11A and 11B are diagrams showing a first example in which step-by-step hidden surface removal is required.
Figure 11B:
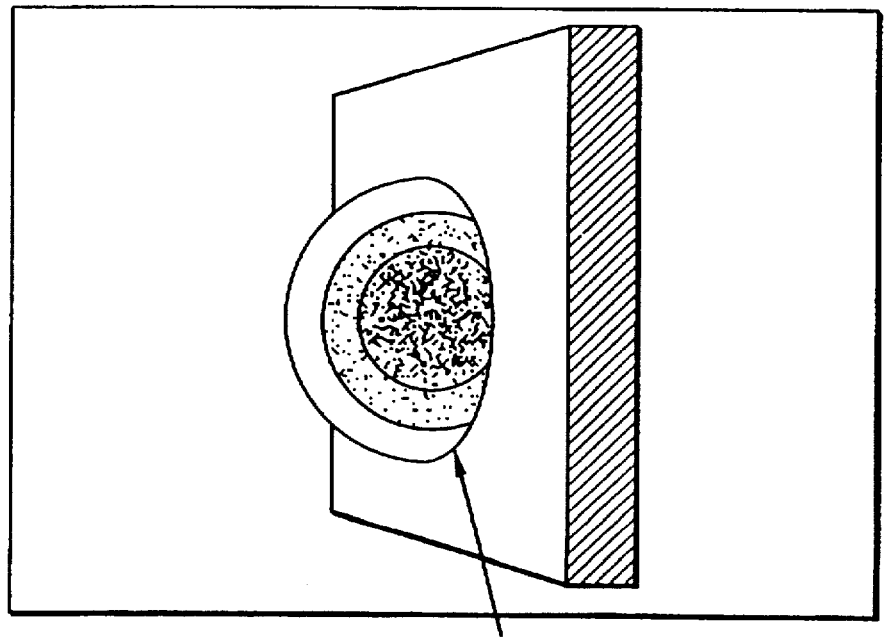
Figure 12A:
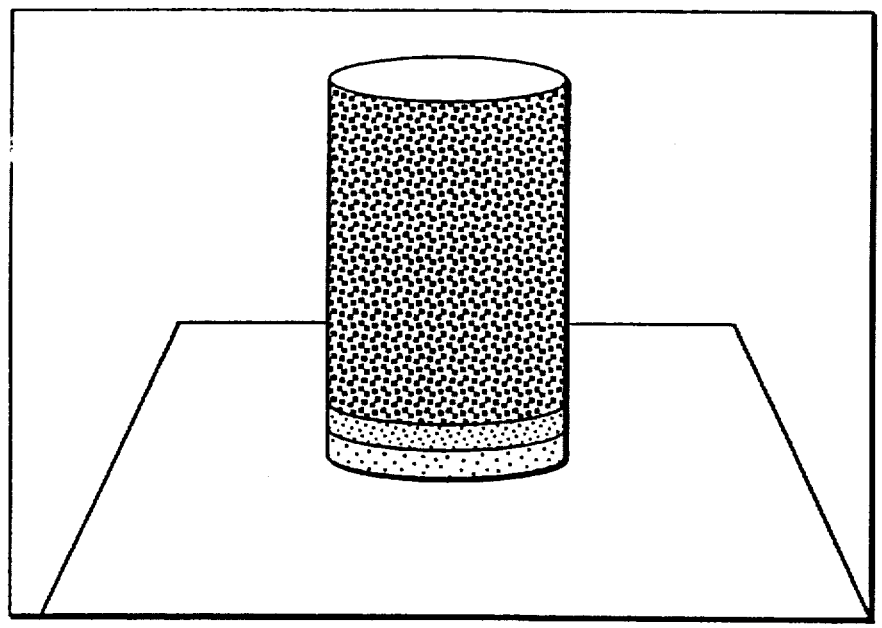
FIGS. 12A and 12B are diagrams showing a second example in which step-by-step hidden surface removal is required.
Figure 12B:
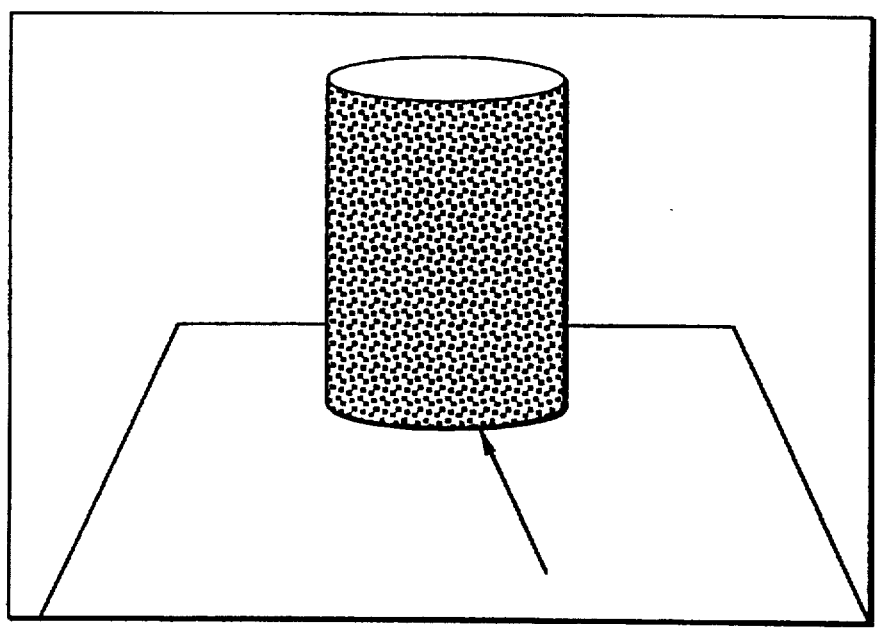

The Z buffer HSRD of this embodiment, as shown in FIG. 3, comprises an input-output portion 1 for inputting Z data, an address, and an Opacity value A, from the outside and for outputting an Opacity value A, Z data, and a write control signal, to the outside. The Z buffer HSRD further comprises a Z buffer portion 2 in which reading and writing of Z data are performed according to a given Z buffer address and a given Z buffer portion control signal, an A modulator portion 3a to which an Opacity value A and an A modulator portion control signal from the input-output portion 1 are input and which changes and outputs the Opacity value A according to the A modulator portion control signal, and a Z operation circuit portion 6 to which a Z value and an address are input and which performs an operation in response to the Z operation circuit control portion control signal.

The operation of this embodiment will hereinafter be described along the flowchart of FIG. 4. Assume that the Z operation circuit portion 6 is in a new data waiting state.

If data is input from the outside to the input-output portion 1, it will inform the Z operation circuit portion 6 that an address and Z data (Zs) arrived, with the Z operation circuit portion control signal. The Z operation circuit portion 6 reads out the address and the Z data (step S21) and at the same time outputs an increment request to the data number counter with the counter control signal. The Z operation circuit portion 6 supplies the address to the Z buffer portion 2, and outputs an output request to the Z buffer portion 2 through the Z buffer portion control signal. According to the Z buffer portion control signal, the Z buffer portion 2 outputs Z data stored in the position of the address (step S22).

The Z data (Zd) input from the Z buffer portion 2 and the Z data (Zs) input from the input-output portion 1 are compared by the Z operation circuit portion 6 (step S23). When the comparison result matches with a condition determined by the Z operation circuit portion control signal that was input from the input-output portion 1 (step S24), a "1" is output as a write control signal (step S25). The Z data Zs and the address Adr are output to the Z buffer portion 2, a write request is made with the Z buffer portion control signal, and according to that request, the Z buffer portion 2 stores the Z data in the position corresponding to the address (step S26).

When, on the other hand, the comparison result does not match with the above-described condition, a "0" is output as a write control signal (step S27) and the write operation is not performed in the Z buffer portion 2. The write control signal is output to the outside through the input-output portion 1.

Next, the Z operation circuit portion 6 subtracts Zd from Zs according to an operation method that is determined by the Z operation circuit portion control signal from the input-output portion 1 (step S28), and the result is output as a Z operation result (Zam) to the A modulator portion 3a.

To the A modulator portion 3 there are input an Opacity value A from the input-output portion 1 and the Z operation result Zam from the Z operation circuit portion 6. The Zam and the Opacity value A are calculated according to an operation method that is determined by the A modulator portion control signal from the input-output portion 1, and the result is output as an Opacity value A to the input-output portion 1 (step S29). The Opacity value A is output to the outside through the input-output portion 1. Then, the Z operation circuit portion 6 will be in a new data waiting state.

The exceptional operation of this embodiment will hereinafter be described.

If a request to output Z data is made from the outside, the input-output portion 1 will output the address to the Z operation circuit portion 6 and also output a transfer request of the Z data through a Z operation circuit portion signal. According to the request, the Z operation circuit portion 6 outputs the address to the Z buffer portion 2 and also requests the output of the Z data with the Z buffer control signal. According to the output request, the Z buffer portion 2 outputs the Z data corresponding to the address. Then, the Z operation circuit portion 6 receives the Z data and outputs it to the input-output portion 1. The Z data received by the input-output portion 1 is output to the outside.

Many widely different embodiments of the present invention may be constructed without departing from the spirit and scope of the present invention. It should be understood that the present invention is not limited to the specific embodiments described in the specification, except as defined in the appended claims.

What is claimed is:

1. A hidden surface removal device comprising:

Z buffer means for storing a Z value of each of pixels to be displayed;

input-output means for inputting and outputting a Z value, an Opacity value representing an opacity of corresponding pixel in an object, and an address data;

Z operation circuit means for performing a Z operation for each pixels by using said Z value outputted from said input-output means and said Z value stored in said Z buffer means, and for outputting a write control signal and a result of said Z operation to said input-output means in accordance with said result of said Z operation; and means for changing said opacity value based on said result of said Z operation, so as to display said object whose transparency changes according to the distance and thickness with reality.

2. A hidden surface removal device according to claim 1, wherein said input-output means outputs said Z value stored in said Z buffer means and an address corresponding to said Z value, in response to a request from an external device.

3. A method of removing a hidden surface comprising the steps of:

storing a Z value of each of pixels to be displayed;

inputting and outputting a Z value, an opacity value representing an opacity of corresponding pixel in an object, and address data;

performing a Z operation for each pixels by using said output Z value and said stored Z value, and for outputting a write control signal and a result of said Z operation in accordance with said result of said Z operation; and changing said opacity value based on said result of said Z operation, thereby displaying said object whose transparency changes according to the distance and thickness with reality.

* * * * *